United States Patent
Apstein

[15] 3,663,845
[45] May 16, 1972

[54] FLUIDIC GENERATOR

[72] Inventor: Maurice Apstein, Bethesda, Md.
[73] Assignee: The United States of America as represented by the Secretary of the Navy
[22] Filed: Feb. 18, 1971
[21] Appl. No.: 116,364

[52] U.S. Cl. ................................................310/15, 310/27
[51] Int. Cl. .........................................................H02k 35/06
[58] Field of Search ....................310/15, 25, 27; 290/43, 44, 290/54, 55; 73/194 EM

[56] References Cited

UNITED STATES PATENTS

| | | | |
|---|---|---|---|
| 2,895,063 | 7/1959 | Morris | 310/15 |
| 2,524,826 | 10/1950 | Pajes | 290/4 |
| 2,904,707 | 9/1959 | Drescher | 310/15 |

Primary Examiner—D. X. Sliney
Attorney—Harry M. Saragovitz, Edward J. Kelly, Herbert Berl and Saul Elbaum

[57] ABSTRACT

A fluidic electric generator having a balanced reed positioned as a rocking member in an air conduit. A spring connected between the reed and the conduit biases the reed in a balanced position. Air flow through the conduit causes the reed to rock at a resonant frequency due to the biasing action of the spring. As the reed rocks, it changes the magnetic reluctance between sets of opposing magnetic poles and causes reversal of flux through the reed thereby inducing an AC signal in surrounding windings. The oscillating reed is oriented in non-impeding relation to the fluidic flow.

10 Claims, 3 Drawing Figures

INVENTOR,
MAURICE APSTEIN

BY Harry M. Saragovitz
Edward J. Kelly
Herbert Berl
Saul Elbaum
ATTORNEYS

Patented May 16, 1972 3,663,845

INVENTOR,
MAURICE APSTEIN
BY Harry M. Saragovitz
Edward J. Kelley
Herbert Berl
Saul Elbaum
ATTORNEYS

FLUIDIC GENERATOR

BRIEF DESCRIPTION OF THE PRIOR ART

This invention relates to air driven electric generators and more particularly to a small generator that is specifically adapted for a fast moving projectile wherein the generator is powered by the relative motion of the projectile through the air.

Air driven generators are well known and early versions of this type of device include a rotatable armature which is driven by a propeller or turbine. The basic operation of the device requires the alternating reversal of flux from a permanent magnet structure so as to induce an AC signal in nearby windings. The flux reversal is usually obtained by the rotating armature which is fabricated from a ferromagnetic material or a permanent magnet.

Although the air driven generators of the rotatable armature type are able to produce an AC signal, they suffer from two principal disadvantages. The primary disadvantage is the low voltage regulation capability of the device. This occurs due to the direct relationship between generator output and the velocity of the rotatable armature. This problem is quite manifest in the case of projectiles since these bodies will usually pass through a wide speed range during flight.

A second disadvantage of the earlier air driven generators resides in the complexity of construction. Because these air driven generators include rotatable armatures, precision bearings are required. However, even with such bearings, the usable life is very short, due to vibration at high speeds.

In an attempt to avoid the disadvantages of earlier air driven generators, a second generation device, as illustrated in U.S. Pat. No. 2,895,063, has come into existence with constructions employing a flapper reed positioned in a channel through which air flows. In the presence of air flow, the reed will assume a resonant vibration and while vibration occurs, flux generated from a nearby permanent magnet structure is caused to reverse through the reed. The alternating direction of the flux through the reed induces an AC signal in surrounding windings.

This latter discussed air driven generator is a definite improvement over the earlier version. However, due to the location of a reed in the generator air conduit, a geometrical situation exists which does not allow relatively free passage of air past the reed. Rather, the reed acts as a flapper valve as it maintains extreme positions during vibration. As a result, the generator suffers from low efficiency which results in relatively low power generation.

BRIEF DESCRIPTION OF THE PRESENT INVENTION

The present invention is an improvement over the prior art. In essence the invention utilizes a spring biased reed that vibrates at a resonant frequency so as to alternately vary the direction of flux through surrounding windings. The unique aspect of the present invention results from the novel geometrical relationship between the components of the air driven generator, namely, a permanent magnet, reed, windings, and air conduit. Due to the particular geometrical relationship between the generator components there is relatively free passage of air past the reed at the same time that the air gaps in the magnetic circuit are small. As a result, the present generator extracts sufficient energy from the air stream to be economically advantageous.

BRIEF DESCRIPTION OF THE DRAWINGS

The specific nature of the invention as well as other objects and advantages thereof, will clearly appear from a description of a preferred embodiment as shown in the accompanying drawings in which.

A DETAILED DESCRIPTION OF THE INVENTION

Figure 1:
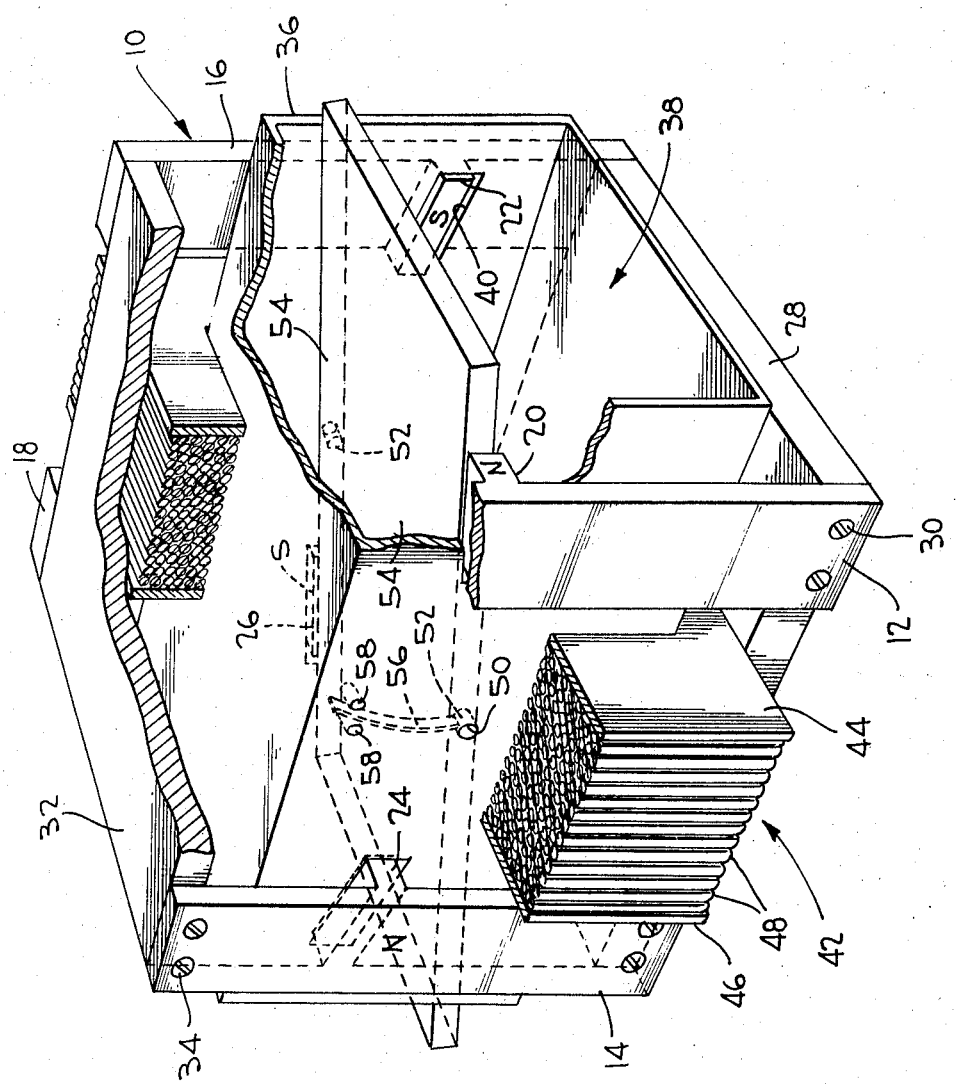
FIG. 1 is a perspective, partially sectioned view of the air driven generator forming the present invention.

Referring to FIG. 1, reference numeral 10 generally denotes the housing of the air driven generator. In a typical use of the present invention, the housing 10 and the enclosed components are mounted in a projectile (not shown). Such a projectile would carry an electric fuze powered by the generator.

The housing 10 comprises several vertically illustrated legs which are ferromagnetic. Along one vertical side of the housing are ferromagnetic legs 12 and 14, while ferromagnetic legs 16 and 18 are positioned in respectively opposite relation.

Pole pieces are arranged along the intermediate length of each ferromagnetic legs. However, each pole piece assumes a particular position with respect to the other pole pieces as will be explained hereinafter. To illustrate a particular magnetic configuration, ferromagnetic legs 12 and 14 are shown to include pole pieces 20, 24 respectively which are indicated as being north poles. In opposition, ferromagnetic legs 16 and 18 include pole pieces 22 and 26, both being south poles.

The housing 10 further includes permanent magnets 28 and 32 to which the ferromagnetic legs 12, 14, 16 and 18 are connected by suitable fasteners 30 and 34. The north poles of both permanent magnets 28 and 32 are connected to ferromagnetic legs 12 and 14 and the south poles are connected to ferromagnetic legs 16 and 18. It is by virtue of this arrangement that pole pieces 20 and 24 are north poles and pole pieces 22 and 26 are south poles.

Figure 2:
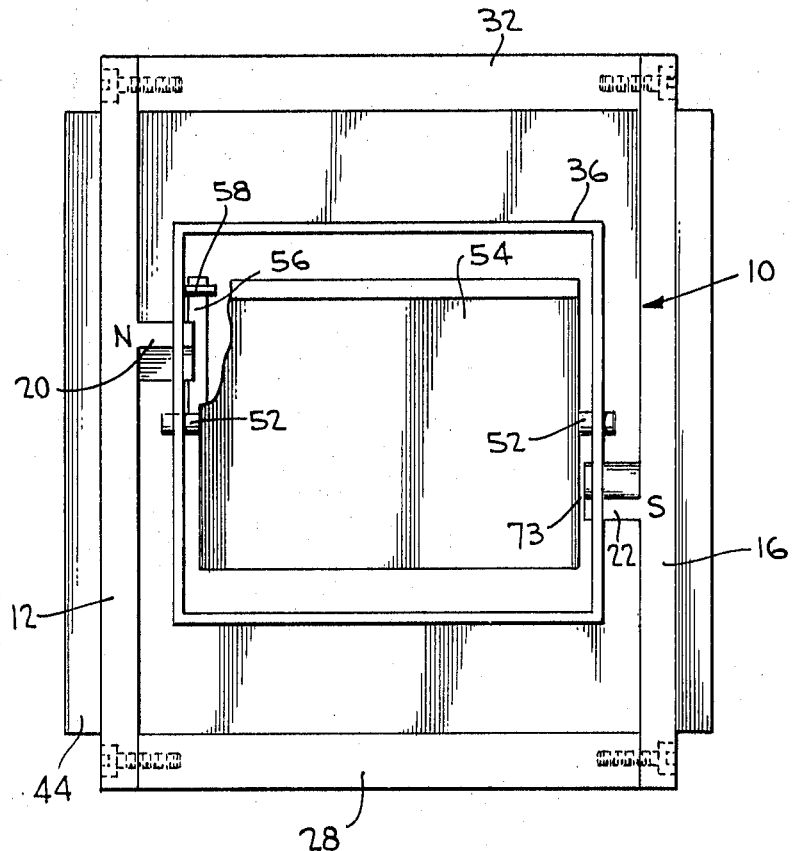
FIG. 2 is a front elevational view of the device shown in FIG. 1.

As shown in FIGS. 1 and 2, the housing 10 forms an open box-like frame. A rectangular non-magnetic conduit is positioned in coaxial inwardly spaced relation to the frame 10. The conduit is indicated by reference numeral 36 and functions to channel the flow of air through the generator. The conduit intake is denoted by 38. In order to allow the projection of the pole pieces, 20, 22, 24, and 26 inwardly through the conduit 36, rectangular apertures 40 are formed at appropriate points along the lateral walls of the conduit 36.

Generator output windings 42 are mounted in outward coaxial relation to the conduit 36. The windings 42 maintain intimate contacting engagement with the conduit 36 and are axially positioned between the ferromagnetic legs 14, 18 and 12, 16. The windings 42 are generally rectangularly shaped and are bounded by mating end plates 44 and 46, although circular and other suitable shapes may be utilized.

Openings 50 are formed at central points along the lateral walls of the conduit 36. These openings receive the pivot pin supports 52 of a ferromagnetic vane or reed 54. The reed rocks about the pivot pins 52 so as to vary its position with respect to the magnetic poles. This will cause the alternating change of flux from the magnetic poles, through the reed.

During operation of the device, when the reed 54 assumes the position shown in FIG. 1, the body of reed 54 lies in coplanar relation with the upwardly tilted north pole piece 20 and south pole piece 26. As will be seen from FIG. 2, only a small air gap 73 is present between the reed and these pole pieces. This results in a magnetic circuit capable of providing a low reluctance path for the flux generated by the pole pieces 20 and 26. In the position illustrated, the flux lines run in a direction from the north pole piece 20 to the south pole piece 26. This induces a voltage of a first polarity in the windings 42. The direction of flux is reversed as the reed 54 changes its position so as to induce an opposite voltage polarity.

Figure 3:
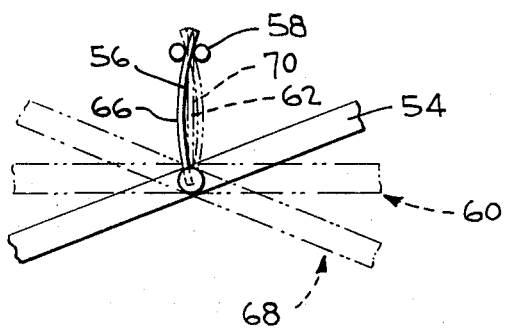
FIG. 3 is a partial elevational view illustrating the biased connection of a reed to a leaf spring.

As illustrated in FIGS. 1 and 3, a spring 56 is connected at a lower end thereof to the pivot pin 52 while the upper end is received between adjacent spaced pins 58 that extend inwardly from a lateral wall of the conduit 36. The spring 56 biases the reed 54 in such a manner as to cause resonant rocking vibration when air flows through the conduit 36.

Referring to FIG. 3, the horizontal position of reed 54 is indicated by reference numeral 60. When the reed assumes this neutral position, the spring 54 maintains a true vertical orientation. When the reed 54 is angled upwardly as shown in FIG. 1 the leaf spring 56 bows in the left direction as indicated by 66 (FIG. 3). When the spring bows this way, the reed 54 is biased downward until it reaches the downward angled position indicated by reference numeral 68. In this position, the spring bows in an opposite direction as indicated by 70. This bowed position of the spring will cause the reed 54 to return to the upper extreme position as shown in FIG. 1 and thereby complete a cycle of vibration. The connection of the spring 56 to the reed 54 establishes a resonant vibration or rocking motion for the reed so long as air rushes through the conduit 36.

Returning to FIG. 1, when the reed 54 assumes the tilted position as indicated by 68 in FIG. 3, reed 54 will become disposed in coplanar relationship with the north pole piece 24 and the south pole piece 22. As in the case of the other pole pieces 20 and 26, the pole pieces 22 and 24 are angled so as to achieve coplanar alignment with reed 54.

When reed 54 tilts downward into coplaner alignment with the pole pieces 24 and 22, the body of reed 54 moves away from the pole pieces 20 and 26 so as to leave a large air gap between the latter pole pieces, which is of sufficiently large reluctance to prevent continued completion of a significant magnetic circuit between these pole pieces. However, a low reluctance path now exists between the magnetic pole pieces 22 and 24 so as to cause the completion of a magnetic circuit there between. Flux now flows between the north pole piece 24 and the south pole piece 22 in a reversed magnetic body of reed 54. The flux reversal induces a voltage in the direction through the ferromagnetic body of reed 54. The flux reversal induces a voltage in the windings 42 of opposite polarity from that previously induced. As the reed 54 rocks between the positions illustrated in FIG. 3, an alternating voltage is produced in the output windings 42.

Due to the particular orientation of reed 54 in conduit 36, relatively free passage of air past the reed 54 is possible when the reed assumes the two extreme tilted positions. At these extreme positions, the reed forms small air gaps with corresponding pole pieces so as to produce a strong magnetic circuit. As a result, a relatively high power output is possible at high efficiency.

Reed oscillators of this type exhibit three important characteristics, namely, they require a minimum airspeed in order for oscillation to start. This threshold is determined by the spring stiffness. Once oscillation has started, both frequency and amplitude remain relatively constant over a wide range of airspeeds. This combination of characteristics results in increased safety for an airborne weapon system because the spring stiffness can be adjusted to require a minimum airspeed to be achieved by the weapon, before generation of power is initiated. After the generator has started, the constant voltage and frequency minimize the voltage regulation problem encountered with prior art devices.

I wish it to be understood that I do not desire to be limited to the exact details of construction shown and described, for obvious modifications can be made by a person skilled in the art.

What is claimed and desired to be secured by U.S. Letters Patent is:

1. A fluid powered generator for producing electrical power comprising:
   a. a conduit having a longitudinal axis;
   b. at least one pair of magnetic north pole pieces positioned along one side of said conduit;
   c. at least one pair of magnetic south pole pieces positioned along a second side of said conduit;
   d. ferromagnetic means mounted within said conduit for developing oscillatory motion in response to the passage of fluid through said conduit such that a low reluctance path is alternatively made between one of said pair of north and one of said pair of south pole pieces, whereby the direction of flux lines is alternatively reversed through said ferromagnetic means; and
   e. means responsive to said flux reversal for generating an alternating voltage.

2. The generator of claim 1 further comprising first and second permanent magnets positioned adjacent said conduit so as to impart north and south polarities, respectively, to said north and south pole pieces.

3. The generator of claim 1 wherein said means responsive to flux reversal comprises a plurality of windings having a central axis coaxial with said longitudinal axis.

4. The structure defined in claim 1 wherein pivot pins integrally connected to the member along the rocking axis are supportingly received in corresponding openings in the conduit, and resilient means connected between at least one pin and the conduit for biasing the member toward a balanced longitudinal position.

5. The structure as claimed in claim 4 wherein the connection of resilient means to the conduit is achieved by passing an end of the resilient means between adjacent spaced projections extending inwardly from a wall of the conduit.

6. A fluid powered generator for producing electrical power comprising a conduit for channeling fluid therethrough, a ferromagnetic member disposed in the conduit for vibrating about a fixed axis as fluid passes through the conduit, a permanent magnet, at least one pair of oppositely fixed magnetic poles disposed in diagonal relation with respect to the ferromagnetic member for completing a magnetic circuit between the poles when the member assumes a position magnetically bridging the poles, and windings arranged around the member for generating an alternating electrical voltage in response to completion of a magnetic circuit.

7. The structure set forth in claim 6 wherein two pairs of diagonally spaced opposing magnetic poles are arranged in pairwise angularly offset relation so that at opposite extremes of ferromagnetic member displacement, each end portion of the said member comes positioned adjacent a corresponding pole thereby alternatively completing a reversing magnetic circuit between each pole pair via the member.

8. The structure defined in claim 7 wherein pivot pins integrally connected to the member along the fixed axis of vibration are supportingly received in corresponding openings in the conduit, and resilient means connected between at least one pin and the conduit for biasing the member toward a balanced longitudinal position.

9. The structure defined in claim 8 wherein the connection of the resilient means to the conduit is achieved by passing an end of the resilient means between adjacent spaced projections extending inwardly from a wall of the conduit.

10. The structure defined in claim 6 wherein the ferromagnetic body is characterized as a rectangular plate symmetrical about the fixed axis of vibration.

* * * * *

UNITED STATES PATENT OFFICE
CERTIFICATE OF CORRECTION

Patent No. 3,663,845     Dated 16 May 1972

Inventor(s) APSTEIN, MAURICE

It is certified that error appears in the above-identified patent and that said Letters Patent are hereby corrected as shown below:

Assignee: The United States of America as represented by the Secretary of the Army.

Signed and sealed this 3rd day of October 1972.

(SEAL)
Attest:

EDWARD M. FLETCHER, JR.
Attesting Officer

ROBERT GOTTSCHALK
Commissioner of Patents